(12) United States Patent
Craycraft et al.

(10) Patent No.: US 6,550,015 B1
(45) Date of Patent: Apr. 15, 2003

(54) SCALABLE VIRTUAL TIMER ARCHITECTURE FOR EFFICIENTLY IMPLEMENTING MULTIPLE HARDWARE TIMERS WITH MINIMAL SILICON OVERHEAD

(75) Inventors: Donald G. Craycraft, Austin, TX (US); Richard G. Russell, Austin, TX (US); Gary M. Godfrey, Austin, TX (US); Mark T. Ellis, Austin, TX (US); Lloyd W. Gauthier, Austin, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 0 days.

(21) Appl. No.: 09/247,876

(22) Filed: Feb. 10, 1999

(51) Int. Cl.[7] .............................. G06F 1/04; G06F 1/14
(52) U.S. Cl. ....................................................... 713/502
(58) Field of Search .................................. 713/500, 502

(56) References Cited

U.S. PATENT DOCUMENTS

| | | | |
|---|---|---|---|
| 3,881,156 A | 4/1975 | Deutsch ........................ 328/129 |
| 4,287,562 A | * 9/1981 | Darden et al. ................ 713/502 |
| 4,879,733 A | 11/1989 | Burch et al. .................... 377/44 |
| 4,912,734 A | 3/1990 | Frauenglass ................... 377/20 |
| 4,926,319 A | * 5/1990 | Wilkie et al. ................. 364/200 |
| 4,942,522 A | 7/1990 | Wilkie et al. ................. 364/200 |
| 4,952,367 A | 8/1990 | Porter et al. .................. 364/200 |
| 5,042,005 A | 8/1991 | Miller et al. .................. 364/900 |
| 5,089,955 A | 2/1992 | Morinaga et al. ............. 395/800 |
| 5,220,661 A | 6/1993 | Hu et al. ....................... 395/550 |
| 5,233,573 A | 8/1993 | Bettelheim et al. ........... 368/113 |
| 5,325,341 A | * 6/1994 | Viot et al. ..................... 368/113 |
| 5,363,499 A | * 11/1994 | Glass ............................ 711/108 |
| 5,491,815 A | * 2/1996 | Basso et al. .................. 713/502 |
| 5,664,167 A | 9/1997 | Pickett et al. ................ 395/557 |
| 5,724,399 A | 3/1998 | Imakura ......................... 377/16 |
| 5,740,451 A | 4/1998 | Muraki et al. ................ 395/733 |
| 5,975,739 A | * 11/1999 | Katayama et al. ........... 364/400 |

OTHER PUBLICATIONS

*Am186™ER and Am188™ER Microcontrollers User's Manual*, Advanced Micro Devices, Inc., ©1998, Chapter 10, pp. 1–8.
*PCI board packs 8 counter/timers*, Electronic Engineering Times, Jun. 29, 1998, p. 74.
*Am9513A/Am9513 System Timing Controller Technical Manual*, Advanced Micro Devices, Inc., ©1990, Chapter 1, pp. 1–28.

* cited by examiner

*Primary Examiner*—Dennis M. Butler
(74) *Attorney, Agent, or Firm*—Akin Gump Strauss Hauer & Feld LLP

(57) ABSTRACT

The scalable virtual timer system or subsystem implements multiple hardware timers with minimal silicon overhead. In one embodiment, for each virtual timer of a plurality of virtual timers, a content addressable memory stores a sum of an "initial state" of a free running counter and a desired count duration for the virtual timer. When the stored value matches a current state of the free running counter, the content addressable memory generates a terminal count for the virtual timer. In an alternative embodiment, for each virtual timer, a period register of a set of period registers stores a sum of a desired count duration for a virtual timer and an "initial state" of the free running counter. A comparator of a set of comparators generates a terminal count for a virtual timer when a current state of the free running counter matches the sum stored in a period register associated with the virtual timer. A state of the free running counter may be read through software, such as by an execution unit, or through hardware, such as by an adder.

23 Claims, 7 Drawing Sheets

SCALABLE VIRTUAL TIMER ARCHITECTURE FOR EFFICIENTLY IMPLEMENTING MULTIPLE HARDWARE TIMERS WITH MINIMAL SILICON OVERHEAD

BACKGROUND OF THE INVENTION

1. Field of the Invention

The present invention relates to hardware timers for processor-oriented systems, and more particularly to a scalable virtual timer architecture for efficiently implementing multiple hardware timers with minimal silicon overhead.

2. Description of the Related Art

As embedded applications become more complex, microcontrollers have experienced a superintegration of memory and peripheral blocks, rendering chip resources even more valuable. The embedded applications industry has responded to superintegration with an effort to provide just enough silicon to microcontrollers to achieve the contemplated functionality. Implementation strategies for minimizing total silicon real estate while maintaining acceptable levels of performance are thus needed.

In large or protocol intensive applications for processor-oriented systems, numerous timers are used to provide reset functionality, interrupt generation functionality, event triggering functionality, and other timing functions. During the execution of these applications, a processor frequently checks the states of numerous timers. This polling of numerous timers has significantly contributed to software overhead in processor-oriented systems.

A basic hardware timer has included a counter, a set of registers, a comparator, and other circuitry (e.g., frequency scaling logic or control logic). A timer typically serves as a device for counting or timing events. A timer accomplishes such a purpose by accumulating (incrementing or decrementing) a count value until a programmed count value is reached. This counting operation is performed by a counter every certain number of clock transitions of a clock signal provided as an input to the timer. A counter, which is the core of a timer, has itself been referred to as a timer or counter/timer. When the timer reaches the programmed count value, the timer expires. Expiration of a timer is commonly termed a "time out." Following a time out, a timer generates a terminal count and performs or triggers a timer action which is typically providing an interrupt to a processor. A timer next may be cleared and reloaded with a new or same programmed count value.

A variety of registers may be used for controlling or supporting a timer. Examples of such registers include timer mode and control registers, timer count registers, load registers, and capture or hold registers. A timer mode and control register typically provides bits for enabling a timer, reflecting the state of a timer, arming a timer, controlling frequency prescaling of a timer, setting the type of timer action performed by a timer, setting a particular operating mode for a timer, and/or selecting a clock source for a timer. A timer count register contains a current count value of a timer. A load register is used to load a counter with a programmed count value. A capture or hold register is used to perform a capture or record operation whereby count data of interest such as the current count value is read by a device such as a processor.

A comparator of a timer is used in determining if the timer has reached its programmed count value. One implementation of such a comparator has been a timer max count compare register. A count compare register contains a programmed count value. For this implementation, the timer is configured to compare the timer max count compare register and a timer count register to determine if the timer has reached the programmed count value.

For processor-oriented systems supporting multiple hardware timers, a hardware timer frequently must provide counting and timing functions independent of any other hardware timer. A conventional approach to providing an additional hardware timer within a processor-oriented system has been to supply another counter, set of registers, comparator, and other circuitry.

The Am186™ ED microcontroller is an example of a processor-oriented system supporting multiple hardware timers. The Am186™ ED microcontroller supports three hardware timers, timer 0, timer 1, and timer 2. The timers are controlled by eleven 16-bit registers in the peripheral control block of the microcontroller. Timer 0 and timer 1 are each associated with a set of four 16-bit registers. The set includes a timer mode/control register, two timer max count compare registers, and a timer count register. The timer 2 is associated with a timer mode/control register, a timer max count compare, register, and a timer count register. Each supported timer of the microcontroller thus has its own set of registers.

SUMMARY OF THE INVENTION

Briefly, in accordance with the present invention, a scalable virtual timer system or subsystem and technique for efficiently implementing multiple hardware timers with minimal silicon overhead is provided.

One embodiment of the scalable virtual timer system includes a content addressable memory for storing an "initial state" or count value of a free running counter and desired count durations for a plurality of virtual timers. When a sum of an "initial state" of the free running counter and a desired count duration for a virtual timer of the plurality of virtual timers matches a state of the free running counter, the content addressable memory generates a terminal count for the virtual timer.

In an alternative embodiment of the scalable virtual timer system, a period register of a set of period registers stores a sum of a desired count duration for a virtual timer of the plurality of virtual timers and the "initial state" of the free running counter. A comparator of a plurality of comparators generates a terminal count for a virtual timer when a state of the free running counter matches a sum of an "initial state" of the free running counter and the desired count duration for the particular virtual timer.

In accordance with the present invention, a technique for efficiently implementing multiple hardware timers with minimum silicon overhead utilizes the scalable virtual timer system. The state of the free running counter of the scalable virtual timer system is read. If the state of the free running counter matches a sum of an "initial state" of the free running counter and a desired count duration stored in a storing means, then the particular match is detected. An operation for detecting such a match may involve adding the desired count duration and the "initial state" of the free running counter. In response to detection of a match between the stored sum for a virtual timer and the state of the free running counter, the scalable virtual timer system generates a terminal count for the particular virtual timer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
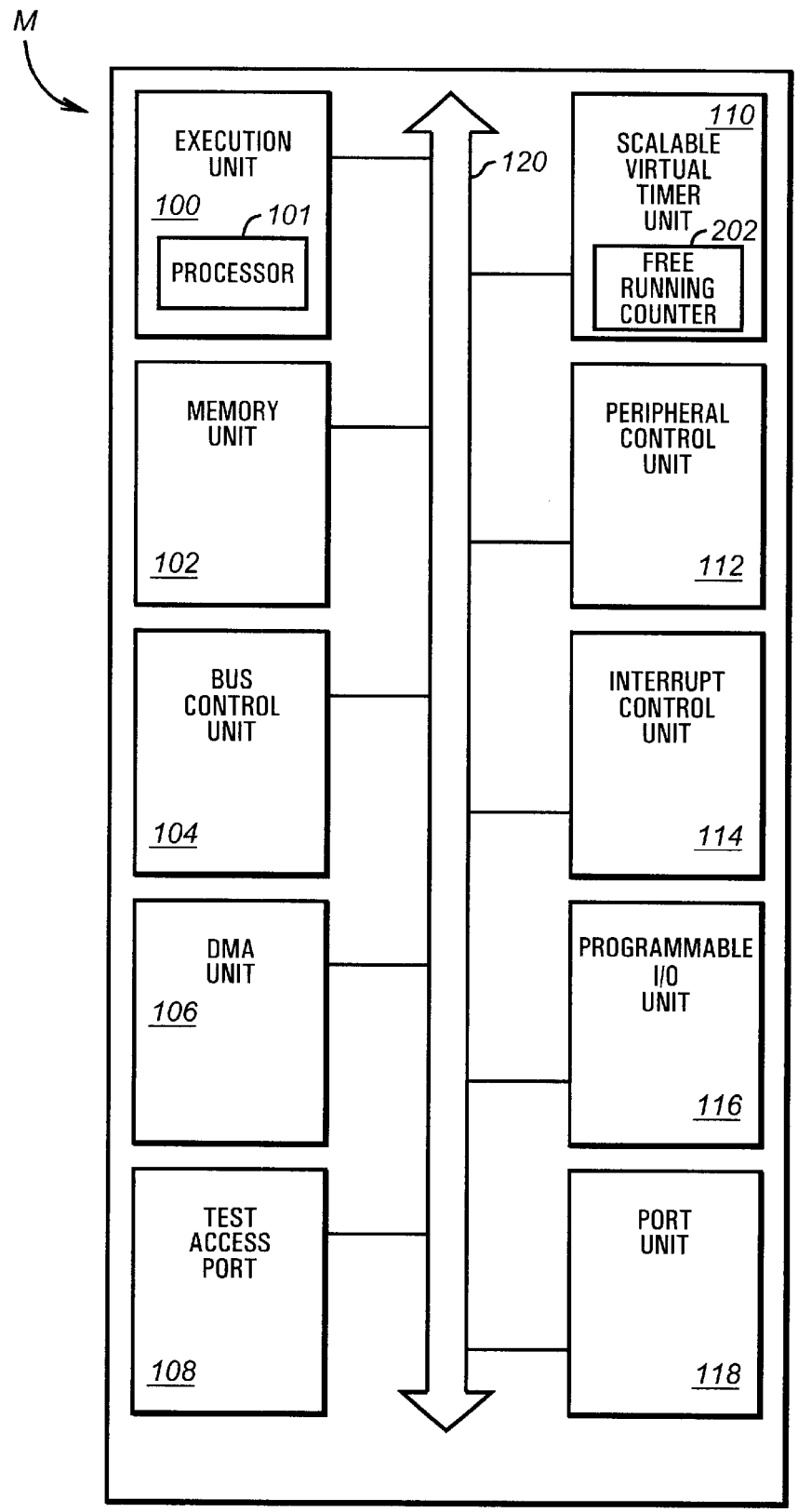
FIG. 1 is a block diagram of a processor-oriented system including a scalable virtual timer unit in accordance with the present invention.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a scalable virtual timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the Am186 instruction set implemented in a variety of microcontrollers from Advanced Micro Devices, Inc. of Sunnyvale, Calif. A variety of other execution units could be used instead of the execution unit 100.

The memory unit 102 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory, access transfers between the units of the microcontroller M. The test access port 108 provides a scan interface for testing the microcontroller M in a production environment and supports a test access port (TAP) controller for controlling test logic of the port 108.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/O unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high speed transfers. The serial port interface and infrared interface may be driven by an industry-standard universal asynchronous receiver/transmitter (UART) so as to permit PC compatibility.

A variety of configurations and combinations of these units of the microcontroller M are possible. The microcontroller M, for example, could be the Am186™ ED microcontroller, the Elan™ SC400 microcontroller, or the Am186™ CC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

In accordance with the present invention, the scalable virtual timer unit 110 supports a plurality of virtual timers.

Figure 3:
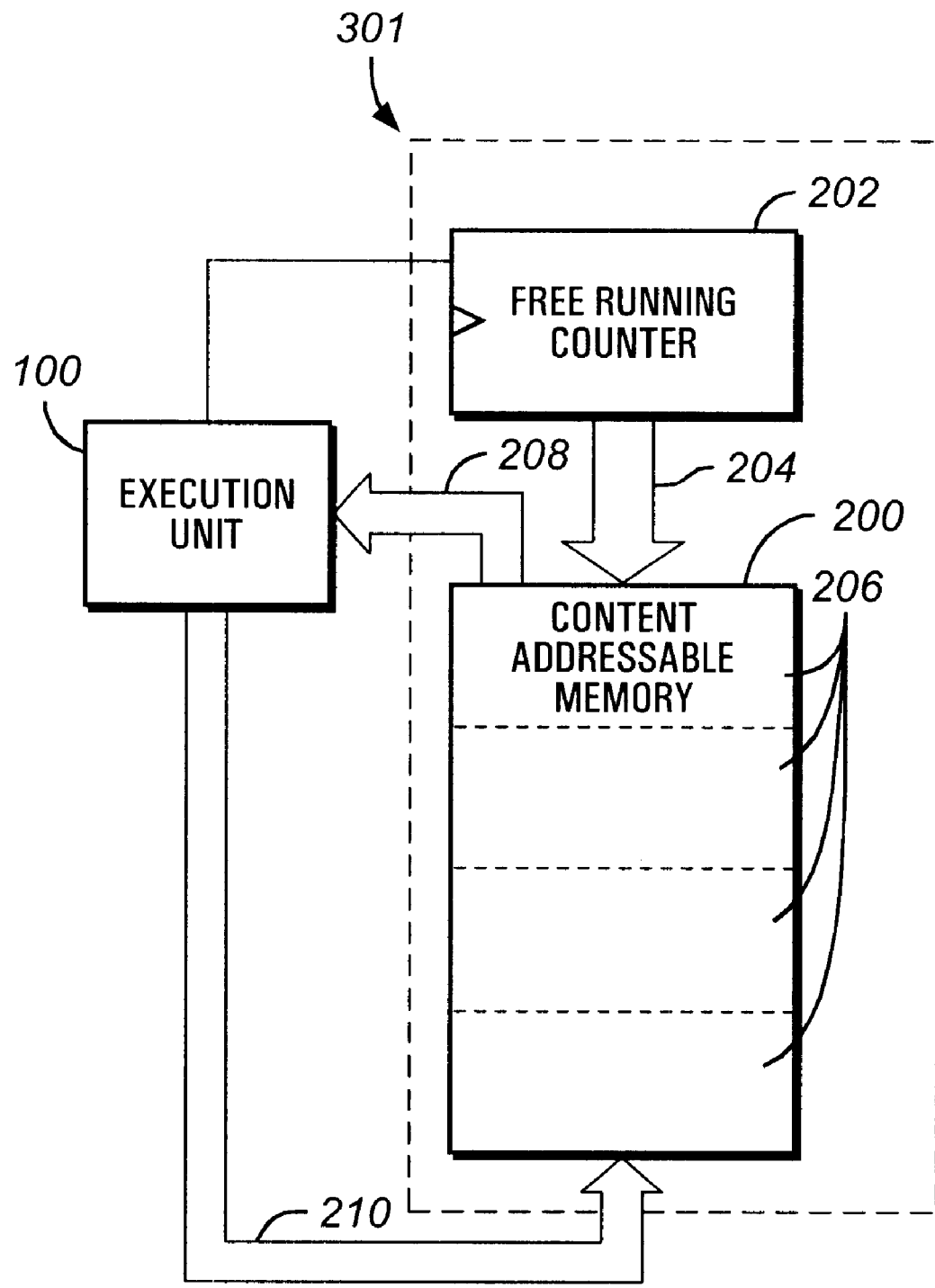
FIG. 3 is a schematic diagram of a content addressable memory embodiment of the scalable virtual timer unit of FIG. 1 in accordance with the present invention.
Figure 4:
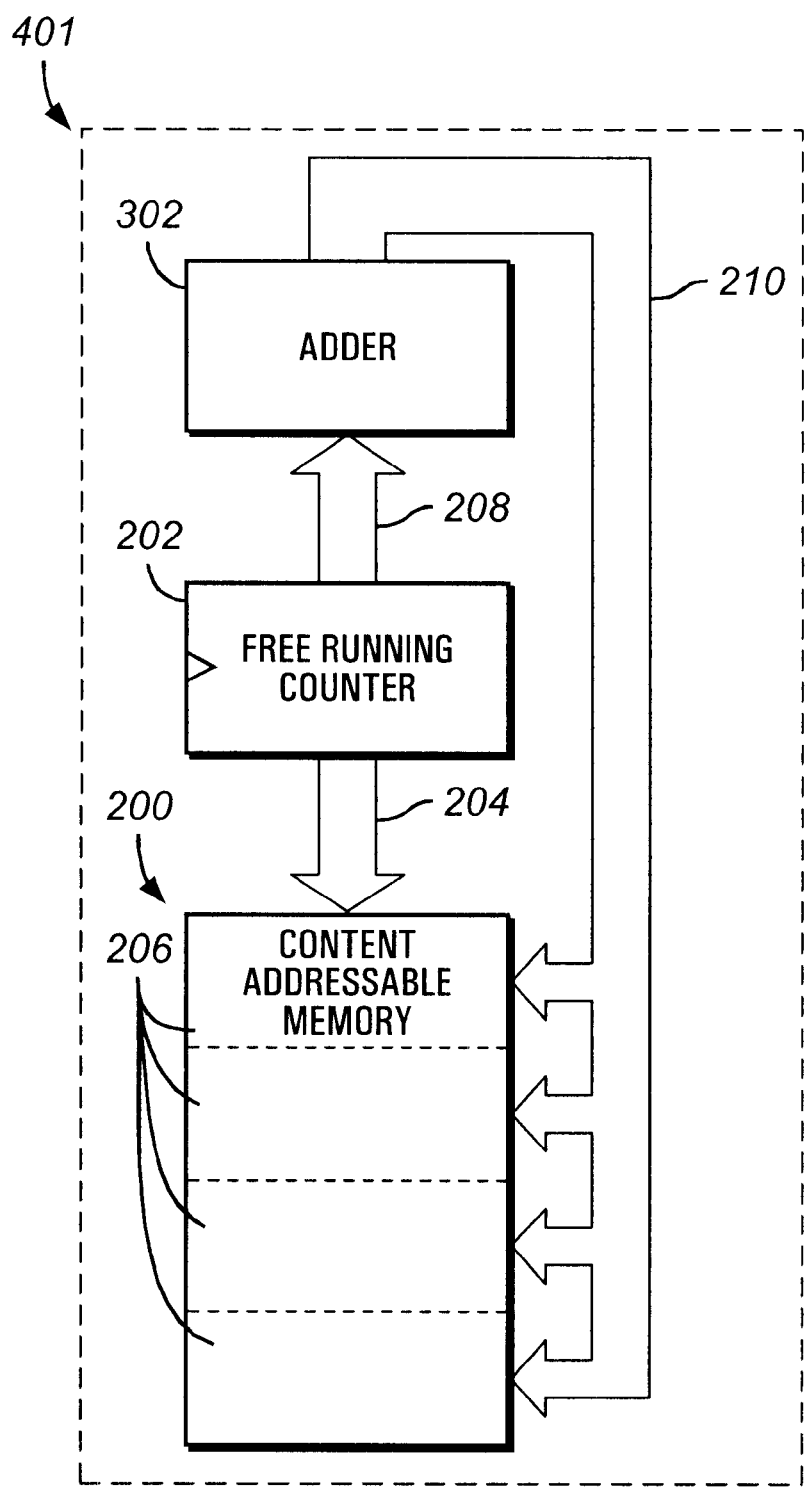
FIG. 4 is a schematic diagram of the content addressable memory embodiment of FIG. 3 including an adder in accordance with the present invention.
Figure 5:
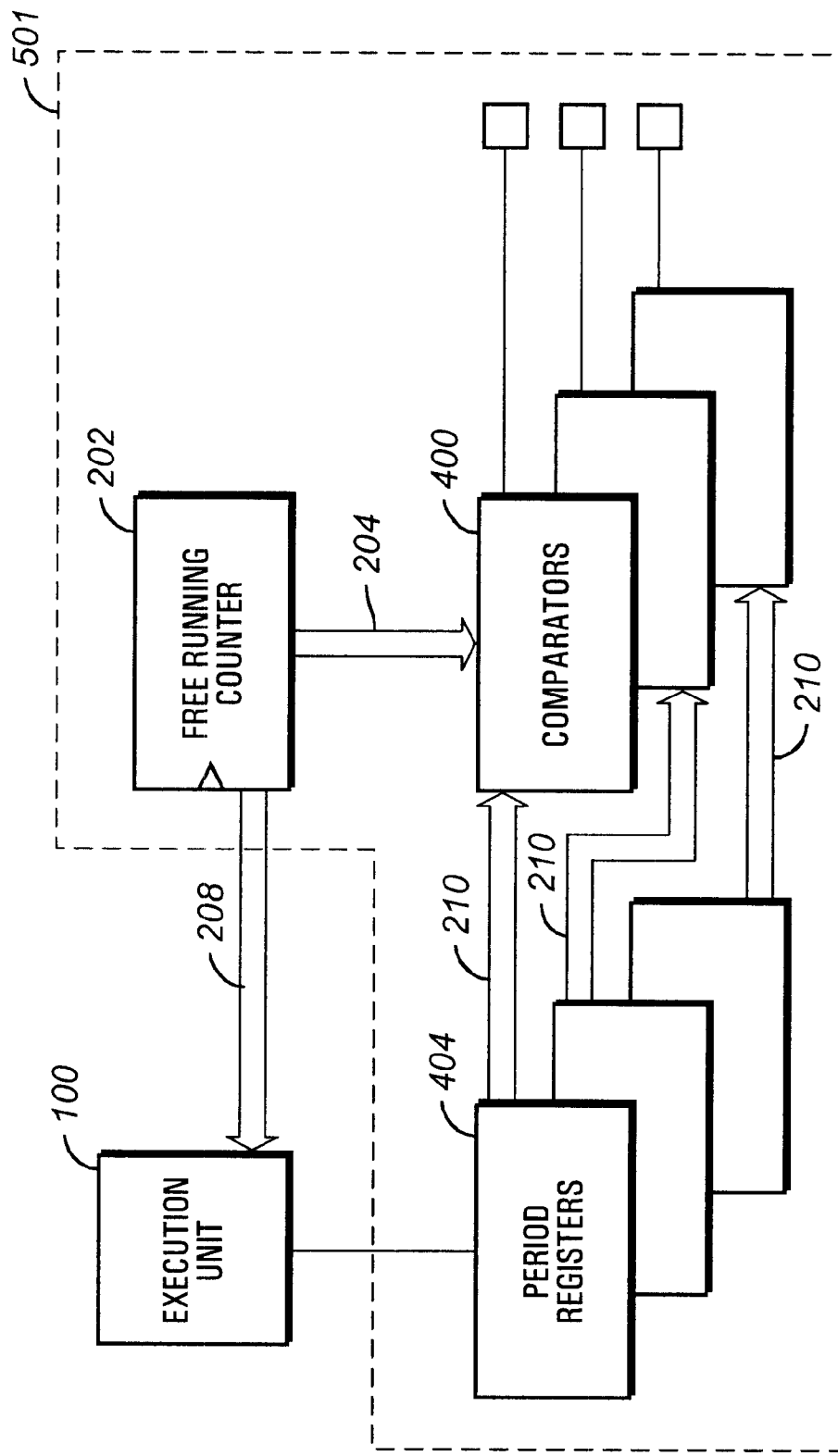
FIG. 5 is a schematic diagram of a period register embodiment of the scalable virtual timer unit of FIG. 1 in accordance with the present invention.

The plurality of virtual timers share a single free running counter 202 (FIGS. 3–5). Each virtual timer derives its own terminal count timing from the counter 202 and is associated with a desired count duration. A virtual timer generates a terminal count at a particular count value (or state) of the free running counter 202 following the desired count duration of the virtual timer. This particular count value of the free running counter 202 is determined by using the count value of the counter 202 at a count initiation of the virtual timer. For example, when a virtual timer initiates counting, a sum of the desired count duration for the virtual timer and the initial count value or state of the free running counter 202 may be stored. The initial state is the count value of the counter 212 when the virtual timer initiates counting. The generated sum represents the particular count value of the free running counter 202 where the virtual timer will generate a terminal count. A current state of the counter 202 is readable by components such as a processor or adder.

It is contemplated that the free running counter 202 may run at a higher frequency than typically used by conventional counters. In accordance with the present invention, compatibility with conventional counters may be preserved by providing frequency scaling logic and bit shifting logic.

Figure 2:
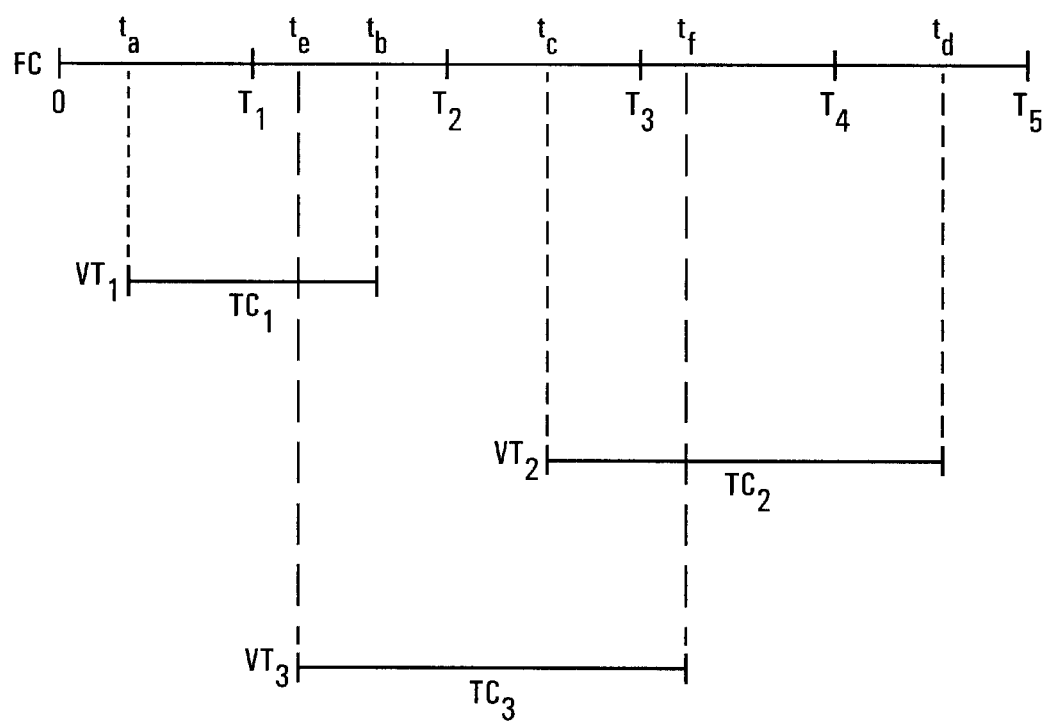
FIG. 2 is a timing diagram illustrating the use of timing of a free running counter of FIG. 1 and FIGS. 3–5 for deriving terminal count timing for a plurality of virtual timers of the scalable virtual timer unit of FIG. 1 in accordance with the present invention.

Referring to FIG. 2, an exemplary timing diagram illustrating the use of timing of the free running counter 202 to derive terminal count timing for multiple virtual timers of the scalable virtual timer unit 110 is shown. In the timing diagram, FC designates the timing of the free running counter 202; $VT_1$ designates the timing of a first virtual timer; $VT_2$ designates the timing of a second virtual timer; and $VT_3$ designates the timing of a third virtual timer. The free running counter 202 is shown with a minimum count value of 0 and a maximum count value of $T_5$. It is appreciated by one skilled in the art that the counter 202 may count in a forward or backward direction. Certain count values for the free running counter 202 between the count value 0 and the count value $T_5$ are also illustrated, namely $T_1$, $T_2$, $T_3$, and $T_4$. These count values of the counter 202 may be equidistant.

The first virtual timer may be initiated at count value $t_a$ of the free running counter 202. To the first virtual timer, the count value $t_a$ is an "initial state" of the counter 202. The desired count duration for the first virtual timer is represented by $TC_1$. Count value $t_b$ of the free running counter 202 corresponds to the count value of the counter 202 after the desired count duration $TC_1$ for the first virtual timer. That is, count value $t_b$ is the count value determined by adding the desired count duration $TC_1$ of the first virtual timer to count value $t_a$.

The second virtual timer is initiated at count value $t_c$ of the free running counter 202 subsequent to count value $t_b$. To the second counter, the count value $t_c$ is an "initial state" of the counter 202. The desired count duration for the second virtual timer is represented by $TC_2$. Count value $t_d$ of the free running counter 202 corresponds to the count value of the counter 202 after the desired count duration $TC_2$ for the second virtual timer. That is, count value $t_d$ is the count value determined by adding the desired count duration $TC_2$ of the second virtual timer to the count value $t_c$.

The third virtual timer is initiated at count value $t_e$ of the free running counter 202 prior to count value $t_b$ and subsequent to count value $t_a$. To the third virtual timer, the count value $t_e$ is an "initial state" of the counter 202. The desired count duration for the third timer is represented by $TC_3$. Count value $t_f$ of the free running counter 202 corresponds to the count value of the counter 202 after the desired count duration $TC_3$ for the third virtual timer. That is, count value $t_f$ is the count value determined by adding the desired count duration $TC_3$ of the third virtual timer to the count value $t_e$.

The terminal count timing for a virtual timer is thus independent of the terminal count timing of other virtual timers. It should be understood that multiple virtual timers may or may not be initiated on the same count values of the free running counter 202. It should further be understood that multiple virtual timers may or may not generate a terminal count on the same count value of the free running counter 202.

In accordance with the present invention, FIGS. 3–5 illustrate three exemplary embodiments of the scalable virtual timer unit 110. Referring to FIG. 3, the illustrated embodiment of the scalable virtual timer unit 301 provides the free running counter 202 and a content addressable memory (CAM) or similar memory array 200. Both the free running counter 202 and the CAM 200 are coupled to the execution unit 100 of the microcontroller M. The CAM 200 is divided into memory portions 206 with each virtual timer being associated with a particular memory portion 206. The size of the CAM 200 is thus determined by the number of virtual timers to be supported. It should be understood that a "virtual timer" in the context of the present invention refers to a special relationship between a free running counter and storage/comparison logic such as described herein for example.

When counting of a virtual timer is initiated, an "initial state" 208 for the free running counter 202 is read by the execution unit 100. As noted above, the initial state 208 of the counter 202 is the count value of the counter 202 when the virtual timer initiates counting. The execution unit 100 also reads a desired count duration for a virtual timer. The execution unit 100 then adds an "initial state" 208 of the free running counter 202 and the desired count duration for the virtual timer and stores the result 210 in a CAM portion 206 corresponding to the particular virtual timer. This result 210 represents the count value of the counter 202 where the particular virtual timer will generate a terminal count. Generation of a terminal count may trigger a timer action such as an interrupt to the execution unit 100. The result 210 calculated by the execution unit 100 may be stored in a CAM portion 206 during set-up of the virtual timer. In addition, after the timer times out, a newly calculated result 210 may be stored in the CAM portion 206. The memory portion 206 of the CAM 200 associated with the particular virtual timer detects when a current count value or state 204 of the counter 202 reaches the count value 210 stored in the particular memory portion 206. This detection may be performed by comparing the current state 204 of the counter 202 to the count value 210 stored in the particular memory portion 206.

Referring to FIG. 4, the illustrated embodiment of the scalable virtual timer unit 401 operates in substantially the same manner as the embodiment of FIG. 3 with the exception of the adding operation. In this embodiment, an adder 302 is provided for adding an "initial state" 208 of the free running counter 202 to a desired count duration for a virtual timer. The adder 302 then provides the result 210 to the CAM portion 206 corresponding to the particular virtual timer.

Referring to FIG. 5, the illustrated period register embodiment of the scalable virtual timer unit 501 provides the free running counter 202, a plurality of comparators 400, and a plurality of period registers 404. Each comparator 400 is associated with a particular virtual timer, and each period register 404 is associated with a particular timer. A comparator 400 for a particular virtual timer is coupled to the period register 404 for that virtual timer. The execution unit 100 is coupled to the plurality of period registers 404 and the free running counter 202.

For this embodiment, the "initial state" 208 of the free running counter 202 is read by the execution unit 100. The execution unit 100 then adds a desired count duration for a virtual timer to the "initial state" 208 of the free running counter 202. The result is then stored by the execution unit 100 in a period register 404. This result 210 may be stored during set-up of the virtual timer. After the virtual timer times out, a newly calculated result 210 may be stored. In the context of the present invention, a "period" register refers to a register for storing a count value 210 of the free running counter 202 where a virtual timer will generate a terminal count. A comparator 400 associated with a virtual timer detects when a current count value 204 of the counter 202 matches the count value 210 stored in the period register 404 associated with the particular virtual timer.

The scalable virtual timer unit provides for efficient scalability of hardware timers. Due to the nature of the virtual hardware timer in accordance with the present invention, hardware timers are scalable without the need for additional counters, affording a savings in valuable silicon real estate of a microcontroller. For the illustrated scalable virtual timer unit embodiments of FIGS. 3–4, a hardware timer may be added by utilizing an additional content addressable memory portion 206. For the illustrated scalable virtual timer embodiment of FIG. 5, a hardware timer may be added by supporting an additional period register 404 and an additional comparator 400.

Figure 6C:
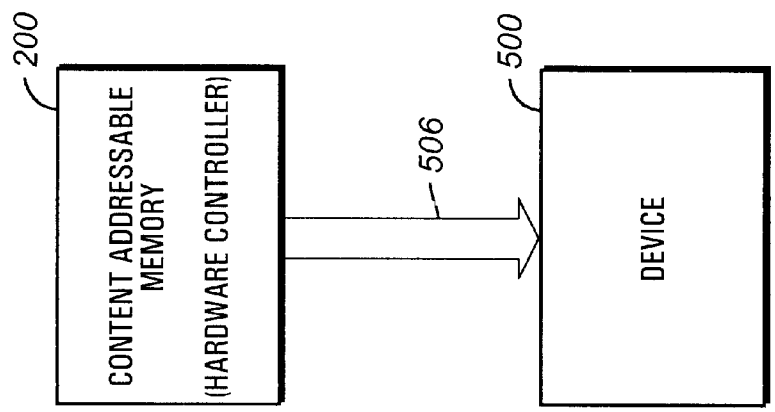
FIGS. 6A–6C are schematic diagrams respectively illustrating the content addressable memory of FIGS. 3 and 4 utilized as an interrupt generator, event trigger, and hardware controller in a accordance with the present invention.
Figure 6B:
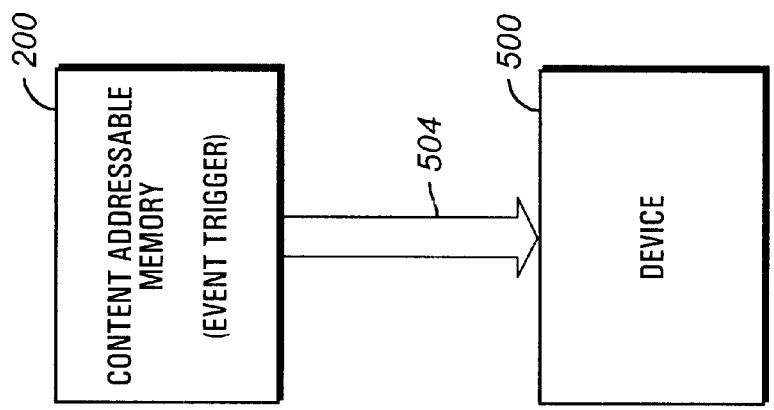
Figure 6A:
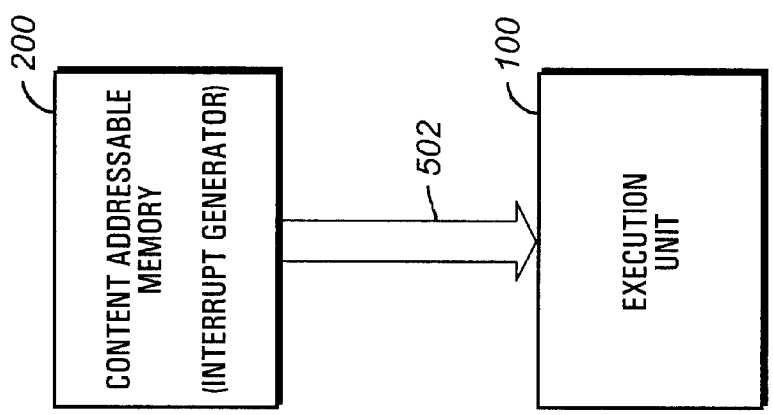

Referring to FIGS. 6A–6C, exemplary applications of the CAM 200 of the scalable virtual timer unit 301 and 401 respectively of FIGS. 3–4 are shown. Following generation of a terminal count by the scalable virtual timer unit 110, the CAM 200 may for example serve as an interrupt generator (FIG. 6A), event trigger (FIG. 6B), or hardware controller (FIG. 6C). When the CAM 200 is used as an interrupt generator, the CAM 200 provides an interrupt request signal 502 to the execution unit 100. As is understood in the art, the interrupt request signal may initially be directed to the interrupt control unit 114 and then routed to the execution unit 100. When the CAM 200 is used as an event trigger, the CAM 200 may provide events to a device 500. Detection of an event may generate a write to a flag of the device 500. The scalable virtual timer unit 110 is particularly suited to events on the same order of magnitude. When the CAM 200 is used as a hardware controller, the CAM 200 may provide control signals 506 to the device 500.

Figure 7C:
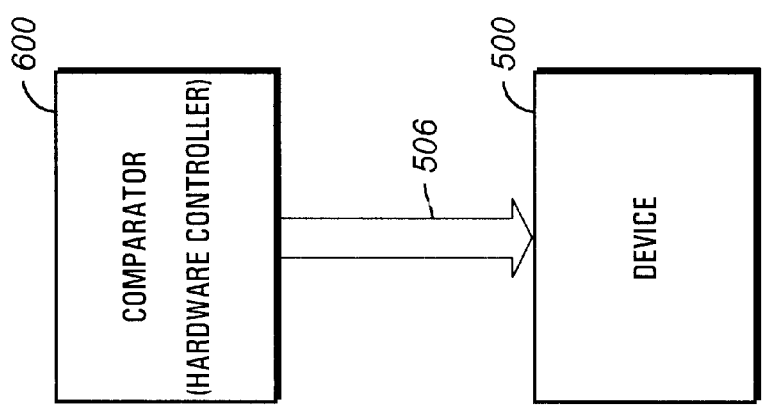
FIGS. 7A–7C are schematic diagrams respectively illustrating the comparators of FIG. 5 utilized as an interrupt generator, event trigger, and hardware controller in accordance with the present invention.
Figure 7B:
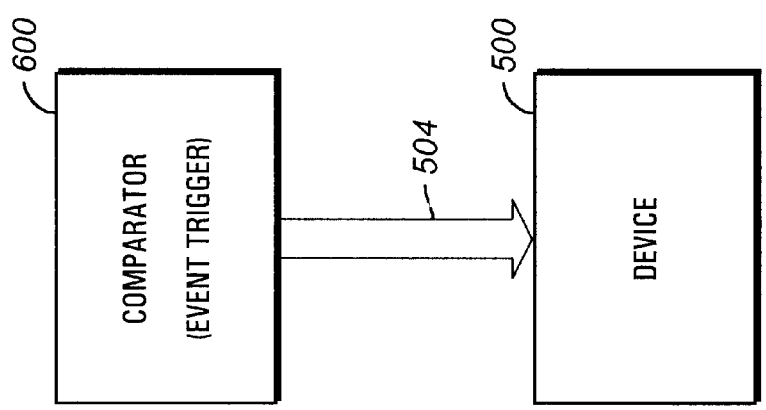
Figure 7A:
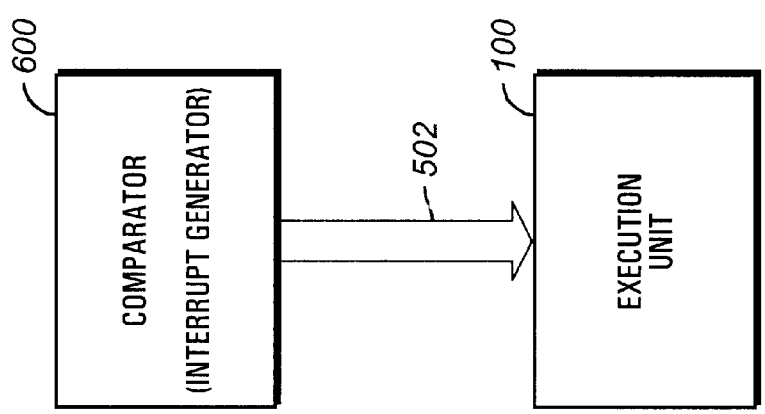

Referring to FIGS. 7A–7C, exemplary applications of a comparator 600 of the scalable virtual timer unit of FIG. 5 are shown. As illustrated, the exemplary applications for a comparator 600 are the same applications as described in connection with FIGS. 6A–6C.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A scalable virtual timer system, comprising:
    a free running counter having a readable state; and
    a content addressable memory for storing a sum of an initial state of the free running counter and a desired count duration of a virtual timer for each virtual timer of a plurality of virtual timers, the content addressable memory generating a terminal count when a current state of the free running counter matches the sum of an initial state of the free running counter and a desired count duration for the virtual timer stored in the content addressable memory, the initial state being a state of the free running counter when the virtual timer initiates counting.

2. The scalable virtual timer system of claim 1, further comprising:
    an adder coupled to the free running counter and the content addressable memory for adding a desired count duration for a virtual timer of the plurality of virtual timers and an initial state of the free running counter.

3. The scalable virtual timer system of claim 1, wherein an execution unit computes a sum of a desired count duration for a virtual timer of the plurality of virtual timers and an initial state of the free running counter and stores the sum in the content addressable memory.

4. The scalable virtual timer system of claim 1, wherein the content addressable memory serves as a controller for a hardware device.

5. The scalable virtual timer system of claim 1, wherein the content addressable memory serves as an interrupt generator.

6. The scalable virtual timer system of claim 1, wherein the content addressable memory serves as a triggering mechanism for a plurality of events.

7. A scalable virtual timer system, comprising:
    a free running counter having a readable state;
    a plurality of period registers, each period register of the plurality of period registers storing a sum of an initial state of the free running counter and a desired count duration for a virtual timer of a plurality of virtual timers associated with the period register; and
    a plurality of comparators, each comparator of the plurality of comparators triggering a terminal count for a virtual timer of the plurality of virtual timers associated with the comparator when a current state of the free running counter matches the sum of a desired count duration for a virtual timer and an initial state of the free running counter stored in a period register associated with the virtual timer.

8. The scalable virtual timer system of claim 7, wherein the plurality of comparators serve as a controller for a hardware device.

9. The scalable virtual timer system of claim 7, wherein the plurality of comparators serve as an interrupt generator.

10. The scalable virtual timer system of claim 7, wherein the plurality of comparators serve as a triggering mechanism for a plurality of events.

11. A microcontroller, comprising:
    an execution unit; and
    a scalable virtual timer subsystem coupled to the processor, comprising:
        a free running counter having a readable state; and
        a content addressable memory for storing a sum of an initial state of the free running counter and a desired count duration for a virtual timer for each virtual timer of a plurality of virtual timers, the content addressable memory generating a terminal count when a current state of the free running counter matches the sum of an initial state of the free running counter and a desired count duration for the virtual timer stored in the content addressable memory, the initial state being a state of the free running counter when the virtual timer initiates counting.

12. The microcontroller of claim 11, the scalable virtual time subsystem further comprising:

an adder coupled to the free running counter in the content addressable memory for adding a desired count duration for a virtual timer of the plurality of virtual timers and an initial state of the free running counter.

13. A microcontroller, comprising:

an execution unit; and a scalable virtual timer subsystem coupled to the execution unit, comprising:

a free running counter readable by the execution unit, the execution unit adding a desired count duration for a virtual timer of a plurality of virtual timers to an initial state of the free running counter, the initial state being a state of the free running counter when the virtual timer initiates counting;

a plurality of period registers, each period register of the plurality of period registers storing a sum of an initial state of the free running counter provided by the execution unit and a desired count duration for a virtual timer of the plurality of virtual timers associated with the period register; and a plurality of comparators, each comparator of the plurality of comparators triggering a terminal count for a virtual timer of the plurality of virtual timers associated with the comparator when a current state of the free running counter matches the sum of an initial state of the free running counter and a desired count duration stored in the period register associated with the virtual timer.

14. A method of efficiently implementing multiple hardware timers with minimal silicon overhead using a scalable virtual timer system, the scalable virtual timer system including a free running counter, a plurality of virtual timers, and a storing means having a plurality of portions associated with the plurality of virtual timers, the method comprising the steps of:

storing a sum of an initial state of the free running counter and a desired count duration for a virtual timer of the plurality of virtual timers to a portion of the storing means associated with the virtual timer;

reading current states of the free running counter;

detecting when a current state of the free running counter matches the sum of an initial state of the free running counter and a desired count duration for a virtual timer of the plurality of virtual timers stored in a portion of the storing means associated with the virtual timer; and generating a terminal count in response to detection of a match by the detecting step.

15. The method of claim 14, further comprising the step of:

adding a desired count duration for the virtual timer and the initial state of the free running counter.

16. The method of claim 15, wherein the adding step is performed by an execution unit.

17. The method of claim 15, wherein the adding step is performed by an adder.

18. The method of claim 14, wherein the reading step is performed by an adder.

19. The method of claim 14, wherein the reading step is performed by an execution unit.

20. The method of claim 14, wherein the detecting and generating steps are performed by a content addressable memory.

21. The method of claim 14, wherein the detecting and generating steps are performed by a comparator.

22. The method of claim 14, wherein the storing means comprises a content addressable memory.

23. The method of claim 14, wherein the storing means comprises a plurality of period registers.

* * * * *